(12) United States Patent
Chiu et al.

(10) Patent No.: US 8,473,700 B2
(45) Date of Patent: Jun. 25, 2013

(54) PROVIDING VERSIONING IN A STORAGE DEVICE

(75) Inventors: Lawrence Y. Chiu, San Jose, CA (US); Yu-Cheng Hsu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 12/749,186

(22) Filed: Mar. 29, 2010

(65) Prior Publication Data
US 2011/0238888 A1 Sep. 29, 2011

(51) Int. Cl.
*G06F 13/10* (2006.01)
(52) U.S. Cl.
USPC .......................................................... 711/163
(58) Field of Classification Search
None
See application file for complete search history.

(56) References Cited

U.S. PATENT DOCUMENTS

| | | | |
|---|---|---|---|
| 5,745,906 | A | 4/1998 | Squibb |
| 5,893,119 | A | 4/1999 | Squibb |
| 6,018,747 | A | 1/2000 | Burns et al. |
| 7,418,463 | B2 | 8/2008 | Verma et al. |
| 7,694,105 | B2 * | 4/2010 | Sanvido ........................ 711/203 |
| 2003/0069902 | A1 * | 4/2003 | Narang et al. ................. 707/203 |
| 2006/0271725 | A1 * | 11/2006 | Wong ............................. 711/103 |
| 2006/0282644 | A1 * | 12/2006 | Wong ............................. 711/206 |

OTHER PUBLICATIONS

L. Chang, et al., "Real-Time Garbage Collection for Flash-Memory Storage Systems of Real-Time Embedded Systems", ACM Transactions on Embedded Computing Systems, vol. 3, No. 4, Nov. 2004, pp. 837-863.
A. McDonald, et al., "Architectural Semantics for Practical Transactional Memory", IEEE, Proceeding of the 33rd International Symposium on Computer Architecture, 2006.
Corsair, "USB FLash Wear-Leveling and Life Span", Jun. 2007.

* cited by examiner

*Primary Examiner* — Duc Doan
(74) *Attorney, Agent, or Firm* — David W. Victor; Konrad Raynes Davda & Victor LLP (57) ABSTRACT

Provided are a computer program product, system and method for managing Input/Output (I/O) requests to a storage device. A first entry is located in a volume control table for the logical address to write indicating a version number and a first physical location. The write data is written to a second physical location in the storage device. A second entry is added to the volume control table for the logical address in response to preserve mode being enabled. In response to determining that the preserve mode is enabled, the volume control table is updated to have one of the first and second entry for the logical address point to the second physical location and indicate a current version and to have the first or second entry not indicating the current version to indicate the first physical location and a previous version.

19 Claims, 6 Drawing Sheets

PROVIDING VERSIONING IN A STORAGE DEVICE

BACKGROUND OF THE INVENTION

1. Field of the Invention

The present invention relates to a method, system, and computer program product for providing versioning in a storage device.

2. Description of the Related Art

A solid state drive controller manages read and write requests to a solid state storage device, such as a flash disk. The controller may write new data to a different location on the solid state storage device to distribute new writes so as to avoid continually overwriting the same location, which can reduce the life of the solid state storage device. As the storage capacity of solid state storage devices increases and cost decreases, solid state storage devices are being increasingly deployed in storage environments and in some deployments are replacing hard disk drives.

There is a need in the art to provide additional functionality and storage options for solid state storage devices.

SUMMARY

Provided are a computer program product, system and method for managing Input/Output (I/O) requests to a storage device. A write request is received having write data for a logical address in the storage device. A determination is made as to whether preserve mode is enabled. A first entry is located in a volume control table for the logical address indicating a version number of the data in the storage device for the logical address and a first physical location in the storage device having the data for the logical address. The write data is written to a second physical location in the storage device. A second entry is added to the volume control table for the logical address to write in response to determining that the preserve mode is enabled. In response to determining that the preserve mode is enabled, the volume control table is updated to have one of the first and second entry for the logical address point to the second physical location and have the version number indicate a current version and to have the first or second entry not indicating the current version to indicate the first physical location and the version number indicate a previous version.

DETAILED DESCRIPTION

Figure 1:
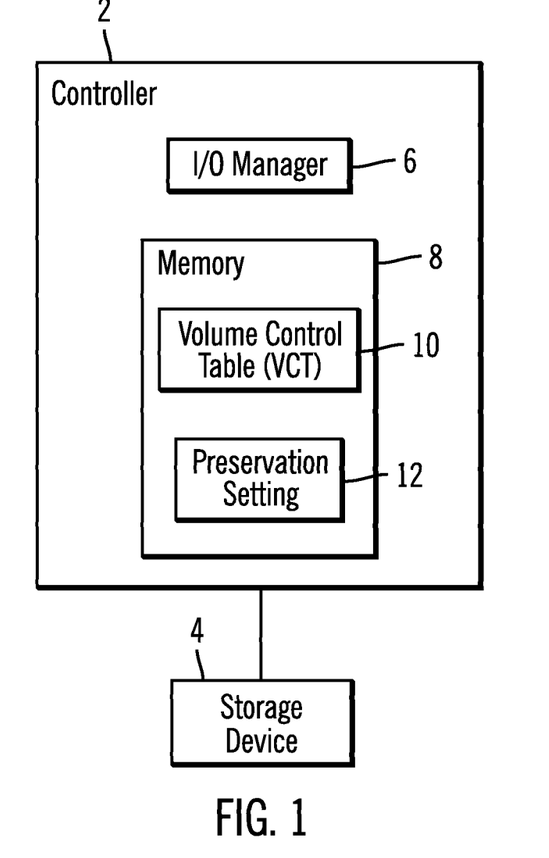
FIG. 1 illustrates an embodiment of a computing environment.

FIG. 1 illustrates an embodiment of a storage controller 2 providing Input/Output ("I/O") access to a storage device 4. The controller 2 includes an I/O manager 6 that manages and processes read and write requests directed to the storage device 4. The I/O manager 4 maintains a working memory 8 to store data used while processing read and write requests and a volume control table (VCT) 10 that describes the data stored in the storage device 4, such as a file allocation table. A preservation setting 12 indicates whether the I/O manager 4 is to maintain older versions of data in the storage device 4. The preservation setting 12 in addition to indicating whether versioning is enabled may indicate a limit on the number of versions maintained for each logical address and/or a version storage capacity indicating a limit on the amount of space that previous versions of data for the logical addresses may consume.

The controller 2 may persistently store the VCT 10 and preservation setting 12 in the storage device 4 or some other non-volatile persistent storage in the controller 2 and load into the memory 8 to access. In alternative embodiments, the volume control table 10 and preservation setting 12 may be stored in a storage device external with respect to the controller 2 to provide a persistent storage of control table 10 and preservation setting 12.

The controller 2 may communicate using different storage protocols, such as Small Computer System Interface (SCSI), Universal Serial Bus (USB), etc. The storage device 4 may be comprised of one or more storage devices, such as a solid state storage device comprised of solid state electronics, such as a EEPROM (Electrically Erasable Programmable Read-Only Memory), flash memory, flash disk, storage-class memory (SCM), etc., magnetic storage disk, optical disk, tape, etc. The memory 8 may comprise one or more volatile or non-volatile memory devices. The I/O manager 6 may be implemented with hardware logic, such as an Application Specific Integrated Circuit (ASIC), or as a programmable processor executing code in a computer readable storage medium.

Figure 2:
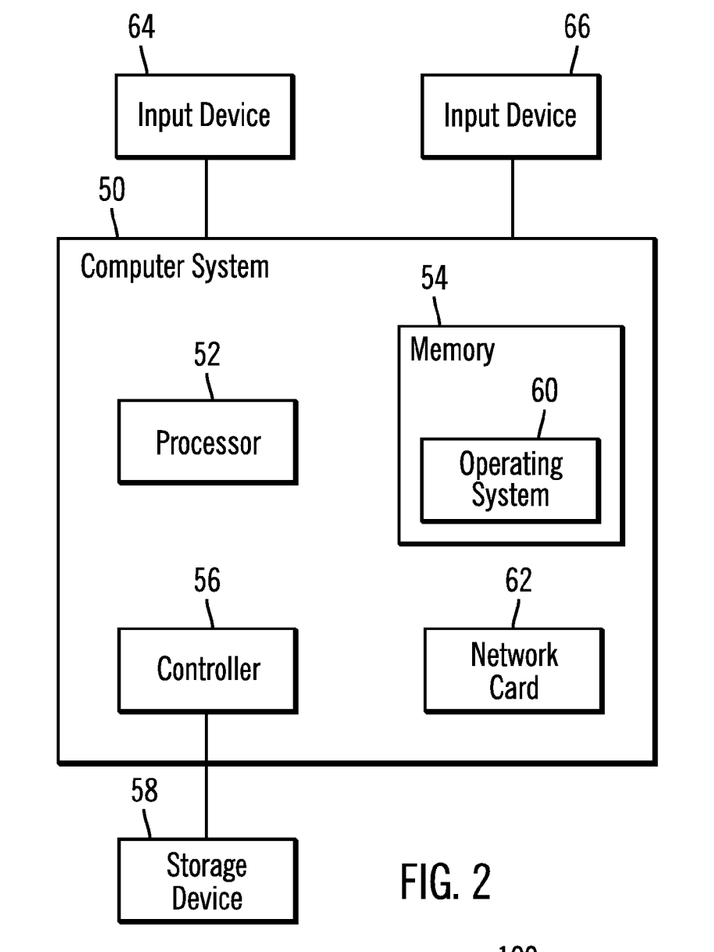
FIG. 2 illustrates an embodiment of a computer system including a controller.

In one embodiment, the controller 2 may comprise a hardware component in a computer system 50, such as shown in FIG. 2. The computer system 50 may include a processor 52 (e.g., a microprocessor), a memory 54 (e.g., a volatile memory device), and a controller 56, such as the controller 2 (FIG. 1) that provides access to an attached storage device 58, such as the storage device 4 (FIG. 1). Programs, including an operating system 60, device drivers and application programs are loaded into the memory 54 and executed by the processor 52 in a manner known in the art. The system 50 further includes a network card 62 to enable communication with a network. An input device 64 is used to provide user input to the processor 52 and may include a keyboard, mouse, pen-stylus, microphone, touch sensitive display screen, or any other activation or input mechanism known in the art. An output device 66 is capable of rendering information transmitted from the processor 52, or other components, such as a display monitor, printer, storage, etc.

Alternatively, some or all of the I/O manager 6 code may be implemented as software loaded into the memory 54 and executed by the processor 52. The storage controller 2 may operate within a server, enterprise storage server, blade server, storage controller card, etc., or other computer devices known in the art, such as workstations, personal computers, laptops, servers, personal digital assistants (PDAs), telephony devices, etc.

Figure 3:
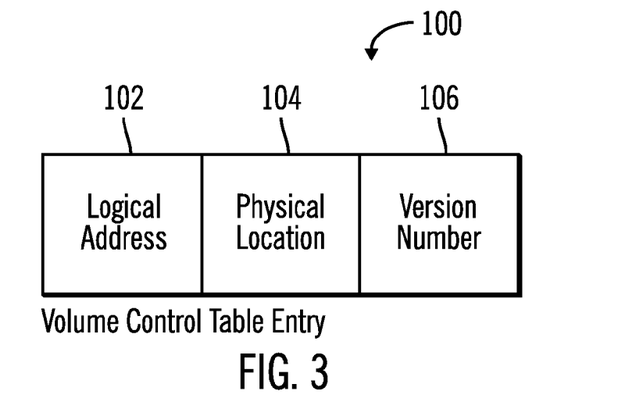
FIG. 3 illustrates an embodiment of an entry in a volume control table.

FIG. 3 illustrates an embodiment of an entry 100 in the VCT 10 for a logical address associated with a block of data in the storage device 4. The VCT entry 100 includes a logical address 102, e.g., a logical block address (LBA), used by systems communicating with the storage device 58 and a physical location 104 on the storage device 58 having data for the logical address 102, e.g., a physical block address (PBA). A version number 106 indicates a version of the data for the logical address 102 at the physical location 104. In one embodiment, the current version may be represented by a zero and each previous version by a negative integer, e.g., negative one indicates a version immediately preceding the current version, a negative two indicates a version twice removed from the current version, etc. In alternative embodiments, alternative numbering or symbol schemes may be used to indicate version numbers. The lack of the version number 106 or physical location 104 may further indicate uninitialized if there is no data for the logical address 102 in the storage device 4.

Figure 4:
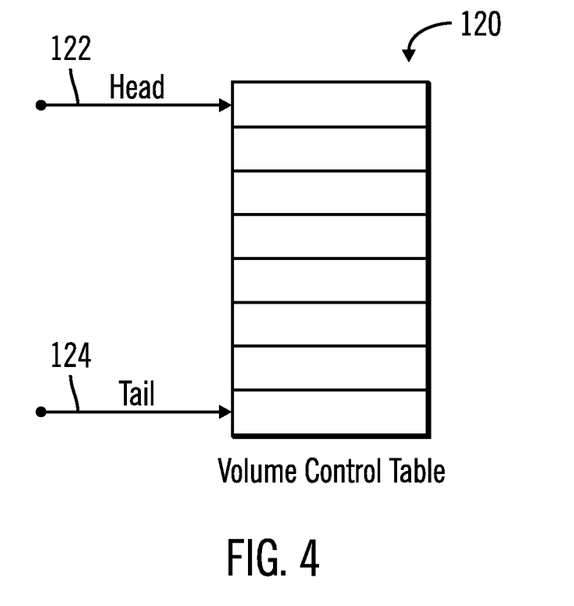
FIG. 4 illustrates an embodiment of a volume control table.

FIG. 4 illustrates an embodiment of the VCT 10 as a linked list 120 of the entries 100 having a head pointer 122 pointing to a front end of the list 120 to which new entries for newly written data are added and a tail 124 pointing to the end of the list. To reclaim data in the storage device 4, the I/O manager 6 may select a previous version closer to the tail pointer 124, where a previous version for a logical address closest to the tail pointer 124 may be considered the oldest previous version for a logical address, and eligible for removal. The oldest version to reclaim may also be selected by selecting an oldest version of a logical address from a set of logical address. In an embodiment where the storage device 4 comprises a solid state storage device, newly written data is written to a new physical location in storage as part of a process called wear leveling to distribute writes across the storage device when updating a frequently accessed logical address, which prolongs the life of a solid state storage device. Continually writing to the same physical location of a solid state device can wear out the storage blocks in the solid state storage device. Alternative embodiments may be used to implement the VCT 10, such as multiple linked lists, e.g., one for each logical address having a list of previous versions for one logical address, a circular buffer or other suitable data structures known in the art.

Figure 5:
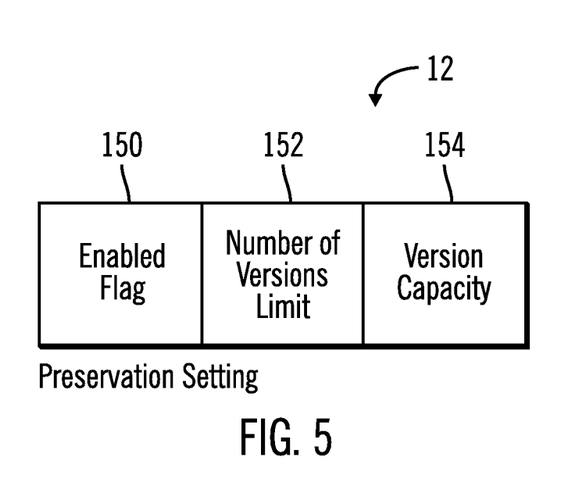
FIG. 5 illustrates an embodiment of a preservation setting for versioning.
Figure 6:
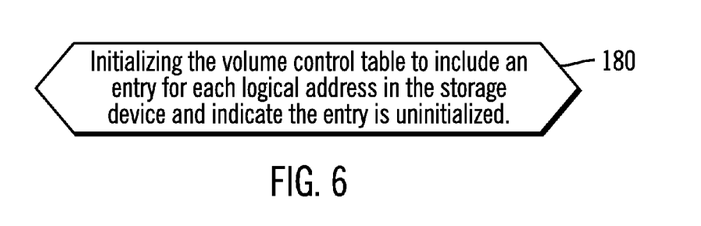
FIG. 6 illustrates an embodiment of an operation to initialize a volume control table.

FIG. 5 illustrates an embodiment of the preservation setting 12 shown in FIG. 1. The preservation setting 12 may have an enabled flag 150 which indicates whether versioning is enabled, i.e., older versions are to be preserved and indexed in the VCT 10. Further, the preservation setting 12 may indicate one or more preservation parameters, such as a number of versions limit 152 indicating a maximum number of versions to maintain for a logical address and/or a version capacity 154 indicating a total amount of storage space in the storage device 4 that may be consumed by previous versions of a logical address 102.

FIGS. 6-9 illustrate embodiments of operations performed by the I/O manager 6 to manage the storage device and manage read and write requests directed to the storage device 4. With respect to FIG. 6, the I/O manager 6 receives (at block 180) an initialization command and in response initializes the VCT 10 to include an entry 100 (FIG. 3) for each logical address available in the storage device 4 and indicate that the entry 100 is uninitialized, by setting the version number 106, physical location 104, and/or other entry field to indicate an uninitialized state.

Figure 7:
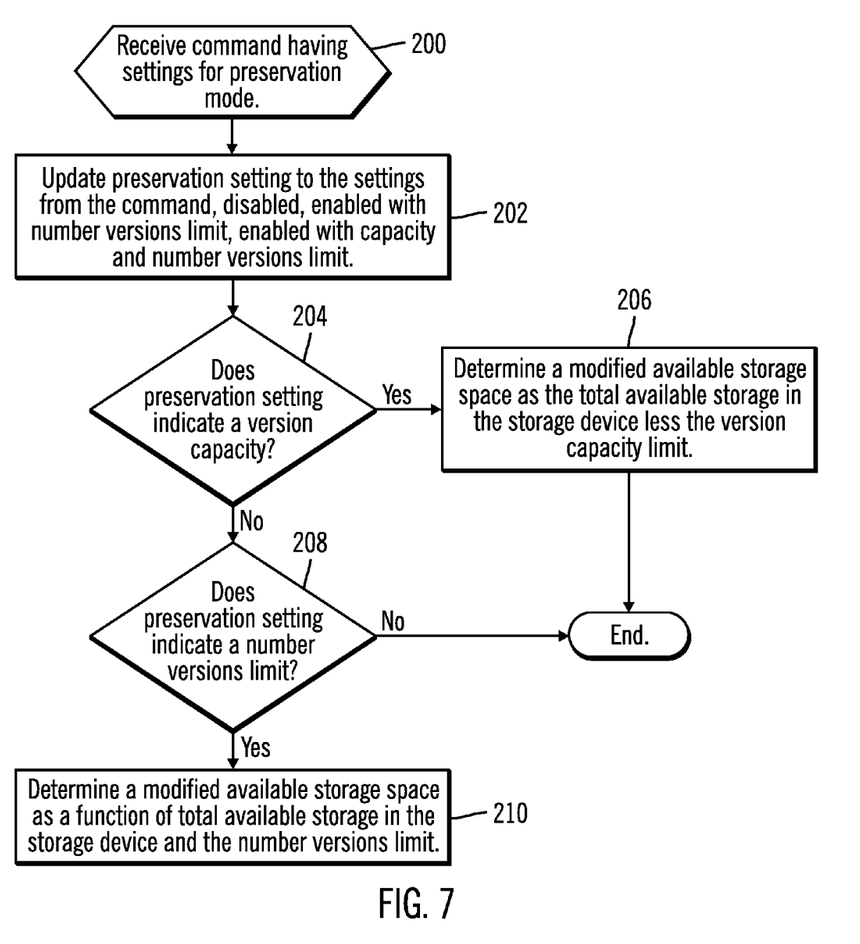
FIG. 7 illustrates an embodiment of operations to change a preservation setting for versioning.

FIG. 7 illustrates an embodiment of operations for the I/O manager 6 to update the preservation setting 12 based on a command received from the system in which the controller 2 is implemented. The preservation settings may be communicated in a protocol command descriptor block (CDB). Upon receiving (at block 200) a command having settings for the preservation mode, which may originate from a user application program or interface, the I/O manager 6 updates (at block 202) the preservation setting 12 to the settings from the command, which may update one or more of the enabled flag 150 to indicate whether versioning is enabled or disabled, the number of versions limit 152 and/or the version capacity 154. In certain embodiment, the communicated preservation settings may indicate to only have a number of versions limit 152, to only have a version capacity 154 or to have both constraints 152 and 154. If (at block 204) the preservation setting 12 indicates a version capacity 154, then the I/O manager determines (at block 206) a modified available storage space for data as the total available storage in the storage device 4 less the version capacity limit 156. In one embodiment, the version capacity is set to guarantee enough space for at least one version of the data for any logical address. If (at block 204) the preservation setting 12 does not indicate a version capacity 156 but instead indicates (at block 208) a number versions limit 154, then the I/O manager 6 determines (at block 210) a modified available storage space as a function of total available storage in the storage device 4 and the number of versions limit 154. In one embodiment, the modified available storage space may comprise the total available storage divided by the number of versions limit 154 value to ensure that there is sufficient space in the storage device 4 for a current version of data and the total number of allowed versions of the data. This modified available storage space is used to determine if storage needs to be reclaimed for a new write or a new version of the data.

Figure 8:
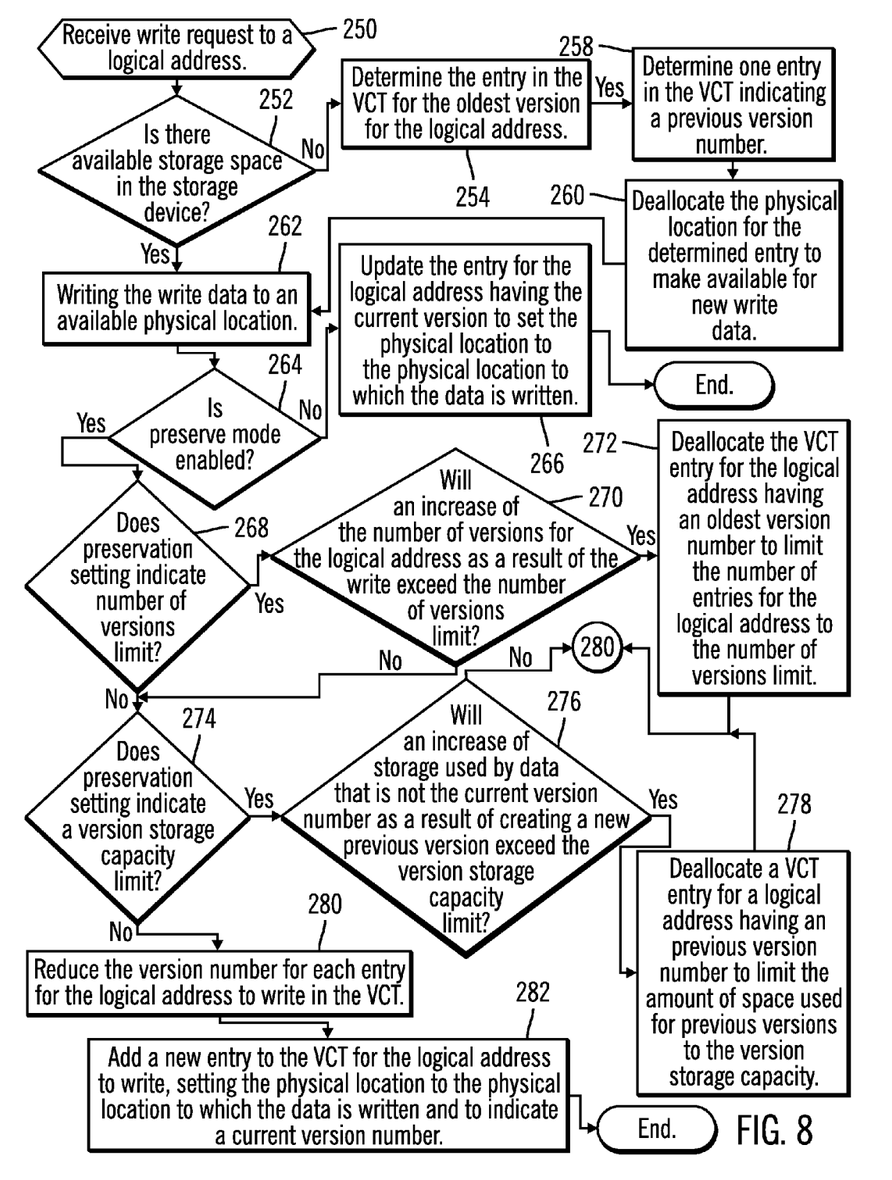
FIG. 8 illustrates an embodiment of operations to process a write request.

FIG. 8 illustrates an embodiment of operations performed by the I/O manager 6 processes a write request to a logical address. Upon receiving (at block 250) a write request, the I/O manager 6 determines (at block 252) whether there is available storage space in the storage device 4. For instance, in one embodiment, the I/O manager 6 determines whether adding the new write data would cause the used storage space to exceed the modified available storage space calculated according to the operations of FIG. 7. If (at block 252) there is no available storage space, then the I/O manager 6 determines (at block 254) the entry 100 in the VCT 10 for the oldest version for the logical address to deallocate. If there is only one entry for the logical address, then the physical address for that location is overwritten. If there are multiple entries for different versions of the logical address, then the oldest version is deallocated to overwrite. In one embodiment, the I/O manager 6 may determine the oldest version number for the logical address being updated, i.e., closest to the tail pointer 124. Alternatively, the I/O manager 6 may determine an entry having a previous version number in the VCT 10 for another logical address, such as an entry for a previous version that has been in the storage device 4 the longest, which may be the entry closest to the tail pointer 124 (FIG. 4). The I/O manager 6 deallocates or reclaims (at block 260) the physical location 104 for the determined entry 100 to make space available for the new write data.

If there is available storage space for the new write (from the yes branch of block 252) or after deallocating an entry 100 for physical location to make space available (from block 260), the I/O manager 6 writes (at block 262) the write data to an available physical location in the storage device 4. If (at block 264) preserve mode is not enabled, i.e., enabled flag 150 of the preservation setting 12 indicates disabled, then the I/O manager 6 updates (at block 266) the entry 100 for the logical address 102 to update having the current version to set the physical location 104 field in the entry 100 to the new physical location to which the data is written. Control then ends. If (at block 264) preserve mode is enabled and if (at block 268) the preservation setting 12 indicates a number of versions limit 152, then the I/O manager 6 determines (at block 270) whether an increase in the number of versions for the logical address due to the write causes the number of previous versions in storage to exceed the number of versions limit 152. If creating a new version as a result of the write will cause the number of versions for the logical address to exceed the limit, then the I/O manager 6 deallocates (at block 272) the VCT entry 100 for the logical address having the oldest version number to limit the number of entries for the logical address to the number of versions limit 152.

If (at block 268) there is no number of versions limit 152 or if (at block 270) increasing the number of versions for the logical address will not exceed the number of versions limit, and if (at block 274) the preservation setting 12 indicates a version storage capacity limit 154, then the I/O manager 6 determines (at block 276) whether an increase in storage including data that is not the current version, i.e., used by previous versions, as a result of creating a new previous version due to the write, causes storage for previous versions to exceed the version storage capacity 154. If (at block 276) the version storage capacity 154 will be exceeded, then the I/O manager 6 deallocates (at block 278) a VCT entry 100 for a logical address having a previous version number to limit the amount of space used by previous versions to the version storage capacity 154. The deallocated VCT entry 100 may be for the oldest version of the logical address being updated or for a previous version of another logical address, such as an oldest version that has been in the VCT table 10 the longest. After deallocating an entry 100 (at block 272 or 278) or if no entry 100 needs to be deallocated to satisfy the preservation settings 152 and/or 154 (from the no branch of block 274), the I/O manager 6 reduces (at block 280) the version number 106 for each entry 100 for the logical address 102 to write in the VCT 10 to indicate a further previous version. The I/O manager 6 then adds (at block 282) a new entry 100 to the VCT 6 for the logical address to write, setting the physical location field 104 to the physical location to which the data is written in the storage device 4 and to indicate the version number 106 as having a current version number. This new entry 100 may be added at the head pointer 122 in the VCT 10.

Figure 9:
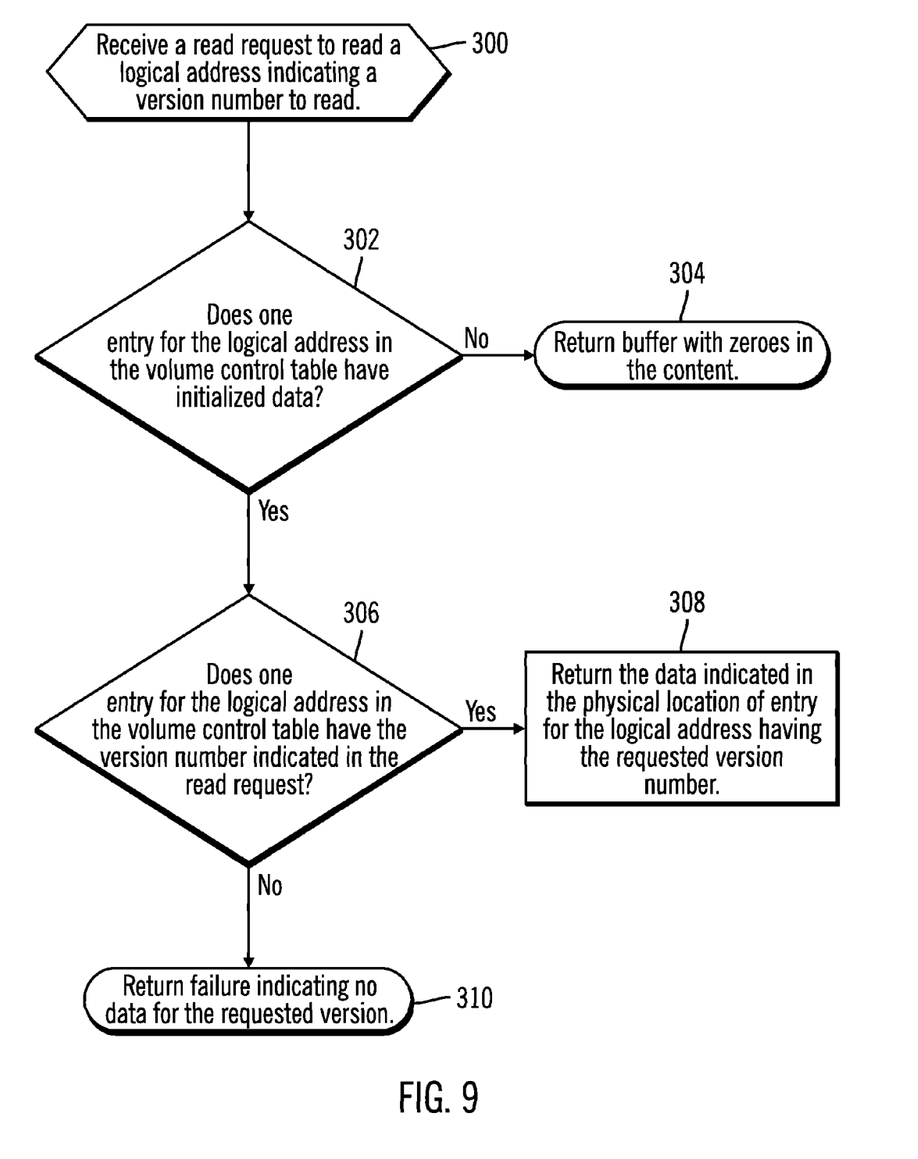
FIG. 9 illustrates an embodiment of operations to process a read request.

FIG. 9 illustrates an embodiment of operations performed by the I/O manager 6 to process a read request to a logical address in the storage device 4. The read request may comprise a SCSI read command including in optional fields a version number to read. Upon receiving (at block 300) a read request to read a logical address indicating a version number to read, the I/O manager 6 determines (at block 302) if the VCT 10 includes one entry for the logical address having initialized data. If not, the I/O manager 6 returns (at block 304) zeroes in the content indicating there is no initialized data. If there is an entry having initialized data and if (at block 306) there is one entry 100 for the logical address in the VCT 10 having a version number 106 specified in the read request, then the I/O manager 6 returns (at block 308) the data indicated in the physical location 104 of the entry 100 for the logical address 102 having the requested version number. If (at block 306) there is no entry 100 in the VCT 10 having a version number 106 matching the version number in the read request, then the I/O manager 6 returns (at block 310) failure indicating no data for the requested version.

Described embodiments provide for the storage of multiple versions for a logical address in storage devices, such as solid state storage devices, by maintaining information on the versions in a volume control table. Further, with described embodiments, the preservation settings may be altered to allow for modifications to the number of previous versions to maintain for a logical address and a storage capacity limit for previous versions. Further, with described embodiments, the read request may specific a version number to return of the requested data.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6-9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for managing Input/Output (I/O) requests to a storage device, the computer program product comprising a computer readable storage medium having computer readable program code embodied therein that executes to perform operations, the operations comprising:

receiving a write request having write data for a logical address in the storage device;

determining whether preserve mode is enabled;

locating a first entry in a volume control table for the logical address indicating a version number of the data in the storage device for the logical address and a first physical location in the storage device having the data for the logical address;

writing the write data to a second physical location in the storage device;

adding a second entry to the volume control table for the logical address to write in response to determining that the preserve mode is enabled;

in response to determining that the preserve mode is enabled, updating the volume control table to have one of the first and second entry for the logical address point to the second physical location and have the version number indicate a current version and to have the first or second entry not indicating the current version to indicate the first physical location and the version number indicate a previous version;

determining at least one additional entry in the volume control table for the logical address to update in addition to the first and second entries; and reducing a version number indicated in the at least one additional entry to indicate a lower version number than the version number currently indicated in the at least one additionally entry.

2. The computer program product of claim 1, wherein updating the volume control table in response to determining that the preserve mode is set comprises:

updating the second entry to indicate the second physical location; and updating at least one of the first entry and the second entry to result in the first entry having the version number indicate the previous version and the second entry having the version number indicating the current version.

3. The computer program product of claim 1, wherein the operations further comprise updating the first entry to indicate the current version and the second physical location in response to determining that the preserve mode is not set.

4. The computer program product of claim 1, wherein the operations further comprise:

receiving user input indicating to enable or disable the preserve mode; and indicating that the preserve mode is enabled or disabled to implement the received user input.

5. The computer program product of claim 1, wherein the preserve mode indicates a number of versions, wherein the operations further comprise:

determining a modified available storage space as a function of total usable storage in the storage device and the number of versions indicated in the preserve mode;

determining whether there is sufficient available space in the modified available storage space to store the write data in response to the write request;

determining one entry in the volume control table indicating a version number older than the current version and a physical location indicated in the determined entry in response to determining that there is not sufficient available space for the write request; and using the physical location in the determined entry as the second physical location for the write data.

6. The computer program product of claim 1, wherein the preserve mode indicates a version storage capacity limit for versions, wherein the operations further comprise:

determining whether increasing an amount of storage including data that is not associated with the current version number by the data in the first location will exceed the version storage capacity limit;

determining one entry in the volume control table indicating a version number older than the current version and a physical location indicated in the determined entry in response to determining that increasing the version storage space will exceed the capacity amount; and deallocating the determined entry.

7. The computer program product of claim 1, wherein the operations further comprise:

receiving a read request for a logical address indicating a version number;

determining whether one entry for the logical address in the volume control table has the version number indicated in the read request; and returning the data at the physical location indicated in the determined entry for the logical address having the version number indicated in the read request.

8. The computer program product of claim 7, wherein the operations further comprise:

returning fail to the read request in response to determining that there is no entry in the volume control table having the version number indicated in the read request.

9. A computer program product for managing Input/Output (I/O) requests to a storage device, the computer program product comprising a computer readable storage medium having computer readable program code embodied therein that executes to perform operations, the operations comprising:

receiving a write request having write data for a logical address in the storage device;

determining whether preserve mode is enabled, wherein the preserve mode indicates a number of versions limit;

locating a first entry in a volume control table for the logical address indicating a version number of the data in the storage device for the logical address and a first physical location in the storage device having the data for the logical address:

writing the write data to a second physical location in the storage device;

adding a second entry to the volume control table for the logical address to write in response to determining that the preserve mode is enabled;

in response to determining that the preserve mode is enabled, updating the volume control table to have one of the first and second entry for the logical address point to the second physical location and have the version number indicate a current version and to have the first or second entry not indicating the current version to indicate the first physical location and the version number indicate a previous version;

determining whether the entries for the logical address other than the entry indicating the current version will exceed the number of versions limit when creating a new previous version as a result of the write request; and deallocating the entry for the logical address having an oldest version number to limit the number of entries for the logical address to the number of versions limit when creating the new previous version.

10. A system for managing Input/Output (I/O) requests to a storage device, comprising:

a computer readable storage medium having a volume control table and preservation setting indicating a preserve mode;

an I/O manager in communication with the computer readable storage medium performing operations, the operations comprising:

receiving a write request having write data for a logical address in the storage device;

determining whether the preserve mode is enabled;

locating a first entry in the volume control table for the logical address indicating a version number of the data in the storage device for the logical address and a first physical location in the storage device having the data for the logical address;

writing the write data to a second physical location in the storage device;

adding a second entry to the volume control table for the logical address to write in response to determining that the preserve mode is enabled;

in response to determining that the preserve mode is enabled, updating the volume control table to have one of the first and second entry for the logical address point to the second physical location and have the version number indicate a current version and to have the first or second entry not indicating the current version to indicate the first physical location and the version number indicate a previous version;

determining at least one additional entry in the volume control table for the logical address to update in addition to the first and second entries; and reducing a version number indicated in the at least one additional entry to indicate a lower version number than the version number currently indicated in the at least one additionally entry.

11. The system of claim 10, wherein the preserve mode indicates a number of versions, wherein the operations further comprise:

determining a modified available storage space as a function of total usable storage in the storage device and the number of versions indicated in the preserve mode;

determining whether there is sufficient available space in the modified available storage space to store the write data in response to the write request;

determining one entry in the volume control table indicating a version number older than the current version and a physical location indicated in the determined entry in response to determining that there is not sufficient available space for the write request; and using the physical location in the determined entry as the second physical location for the write data.

12. The system of claim 10, wherein the preserve mode indicates a version storage capacity limit for versions, wherein the operations further comprise:

determining whether increasing an amount of storage including data that is not associated with the current version number by the data in the first location will exceed the version storage capacity limit;

determining one entry in the volume control table indicating a version number older than the current version and a physical location indicated in the determined entry in response to determining that increasing the version storage space will exceed the capacity amount; and deallocating the determined entry.

13. The system of claim 10, wherein the operations further comprise:

receiving a read request for a logical address indicating a version number;

determining whether one entry for the logical address in the volume control table has the version number indicated in the read request; and returning the data at the physical location indicated in the determined entry for the logical address having the version number indicated in the read request.

14. A system for managing Input/Output (I/O) requests to a storage device, comprising:

a computer readable storage medium having a volume control table and preservation setting indicating a preserve mode, wherein the preserve mode indicates a number of versions limit; and an I/O manager in communication with the computer readable storage medium performing operations, the operations comprising:

receiving a write request having write data for a logical address in the storage device;

determining whether the preserve mode is enabled;

locating a first entry in the volume control table for the logical address indicating a version number of the data in the storage device for the logical address and a first physical location in the storage device having the data for the logical address;

writing the write data to a second physical location in the storage device;

adding a second entry to the volume control table for the logical address to write in response to determining that the preserve mode is enabled;

in response to determining that the preserve mode is enabled, updating the volume control table to have one of the first and second entry for the logical address point to the second physical location and have the version number indicate a current version and to have the first or second entry not indicating the current version to indicate the first physical location and the version number indicate a previous version;

determining whether the entries for the logical address other than the entry indicating the current version will exceed the number of versions limit when creating a new previous version as a result of the write request; and deallocating the entry for the logical address having an oldest version number to limit the number of entries for the logical address to the number of versions limit when creating the new previous version.

15. A computer implemented method for managing Input/Output (I/O) requests to a storage device, comprising:

receiving a write request having write data for a logical address in the storage device;

determining whether preserve mode is enabled;

locating a first entry in a volume control table for the logical address indicating a version number of the data in the storage device for the logical address and a first physical location in the storage device having the data for the logical address;

writing the write data to a second physical location in the storage device;

adding a second entry to the volume control table for the logical address to write in response to determining that the preserve mode is enabled;

in response to determining that the preserve mode is enabled, updating the volume control table to have one of the first and second entry for the logical address point to the second physical location and have the version number indicate a current version and to have the first or second entry not indicating the current version to indicate the first physical location and the version number indicate a previous version;

determinine at least one additional entry in the volume control table for the logical address to update in addition to the first and second entries; and reducing a version number indicated in the at least one additional entry to indicate a lower version number than the version number currently indicated in the at least one additionally entry.

16. The method of claim 15, wherein the preserve mode indicates a number of versions, further comprising:

determining a modified available storage space as a function of total usable storage in the storage device and the number of versions indicated in the preserve mode;

determining whether there is sufficient available space in the modified available storage space to store the write data in response to the write request;

determining one entry in the volume control table indicating a version number older than the current version and a physical location indicated in the determined entry in response to determining that there is not sufficient available space for the write request; and using the physical location in the determined entry as the second physical location for the write data.

17. The method of claim 15, wherein the preserve mode indicates a version storage capacity limit for versions, further comprising:
   determining whether increasing an amount of storage including data that is not associated with the current version number by the data in the first location will exceed the version storage capacity limit;
   determining one entry in the volume control table indicating a version number older than the current version and a physical location indicated in the determined entry in response to determining that increasing the version storage space will exceed the capacity amount; and
   deallocating the determined entry.

18. The method of claim 15, further comprising:
   receiving a read request for a logical address indicating a version number;
   determining whether one entry for the logical address in the volume control table has the version number indicated in the read request; and
   returning the data at the physical location indicated in the determined entry for the logical address having the version number indicated in the read request.

19. A computer implemented method for managing Input/Output (I/O) requests to a storage device, comprising:
   receiving a write request having write data for a logical-address in the storage device;
   determining whether preserve mode is enabled, wherein the preserve mode indicates a number of versions limit;
   locating a first entry in a volume control table for the logical address indicating a version number of the data in the storage device for the logical address and a first physical location in the storage device having the data for the logical address;
   writing the write data to a second physical location in the storage device;
   adding a second entry to the volume control table for the logical address to write in response to determining that the preserve mode is enabled;
   in response to determining that the preserve mode is enabled, updating the volume control table to have one of the first and second entry for the logical address point to the second physical location and have the version number indicate a current version and to have the first or second entry not indicating the current version to indicate the first physical location and the version number indicate a previous version;
   determining whether the entries for the logical address other than the entry indicating the current version will exceed the number of versions limit when creating a new previous version as a result of the write request; and
   deallocating the entry for the logical address having an oldest version number to limit the number of entries for the logical address to the number of versions limit when creating the new previous version.

* * * * *